US012734989B2

(12) United States Patent
Im

(10) Patent No.: US 12,734,989 B2
(45) Date of Patent: Sep. 15, 2026

(54) APPARATUS FOR MOUNTING CURTAIN AIRBAG CUSHION

(71) Applicant: HYUNDAI MOBIS CO., LTD., Seoul (KR)

(72) Inventor: Ji Hyuk Im, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/323,423

(22) Filed: Sep. 9, 2025

(65) Prior Publication Data

US 2026/0241886 A1 Aug. 20, 2026

(30) Foreign Application Priority Data

Feb. 19, 2025 (KR) ........................ 10-2025-0021522
Feb. 25, 2025 (KR) ........................ 10-2025-0024383

(51) Int. Cl.
*B60R 21/232* (2011.01)
*B60R 21/237* (2006.01)

(52) U.S. Cl.
CPC .......... *B60R 21/232* (2013.01); *B60R 21/237* (2013.01)

(58) Field of Classification Search
CPC ..... B60R 21/23; B60R 21/232; B60R 21/237; B60R 21/21; B60R 21/213
See application file for complete search history.

(56) References Cited

U.S. PATENT DOCUMENTS 9,580,036 B2 2/2017 Choi
11,833,991 B2 * 12/2023 Kim ...................... B60R 21/232
12,017,601 B2 * 6/2024 Moran .................. B60R 21/213
2003/0042712 A1 * 3/2003 Henderson ............ B60R 21/213 280/728.1
2010/0066060 A1 * 3/2010 Kalandek .............. B60R 21/217 280/728.2
2022/0355757 A1 11/2022 Kim

FOREIGN PATENT DOCUMENTS

DE 202022001030 U1 * 6/2022 ........... B60R 21/237
EP 1 764 271 A2 3/2007
EP 1 842 741 A2 10/2007
KR 20210157011 A * 12/2021 ........... B60R 21/201

OTHER PUBLICATIONS

Vossius, DE-202022001030-U1, Machine Translation of Specification (Year: 2022).*
Im, KR 20210157011 A, Mechanical Translation of Specification (Year: 2021).*
Extended European Search Report Issued on Feb. 20, 2026, in Counterpart European Patent Application No. 25204204.9 (10 Pages in English).

* cited by examiner

*Primary Examiner* — Jason D Shanske
*Assistant Examiner* — Matthew Joseph Ganci
(74) *Attorney, Agent, or Firm* — NSIP Law

(57) ABSTRACT

An apparatus for mounting a curtain airbag cushion is provided. The apparatus includes a ramp on which the curtain airbag cushion folded in a rolled form is placed and supported, the ramp including a fixing portion, and a mounting plate coupled to the fixing portion of the ramp to fix the ramp to a vehicle body. The mounting plate is provided with a fixing leg protruding toward the fixing portion, and in a state where the fixing leg is inserted in a structure that passes through a coupling hole formed in the fixing portion, the fixing leg is bent by an external force to fix the mounting plate to the fixing portion.

15 Claims, 14 Drawing Sheets

APPARATUS FOR MOUNTING CURTAIN AIRBAG CUSHION

CROSS-REFERENCE TO RELATED APPLICATION

The present application claims priority to and the benefit under 35 USC § 119(a) of Korean Patent Application No. 10-2025-0021522, filed on Feb. 19, 2025, and Korean Patent Application No. 10-2025-0024383, filed on Feb. 25, 2025, in the Korean Intellectual Property Office, the entire disclosures of which are incorporated herein by reference in their entireties for all purposes.

BACKGROUND

1. Field

The present invention relates to an apparatus for mounting a curtain airbag cushion.

2. Description of the Related Art

In general, vehicles are equipped with various types of airbags for protecting occupants when an accident occurs. Among the airbags, a curtain airbag protects an occupant as an airbag cushion deploys while unfolding downward in the event of a vehicle rollover or side collision. This curtain airbag is mounted on a roof side rail of a vehicle body through mounting tabs provided on the airbag cushion. Here, the curtain airbag is mounted on the vehicle body by fastening bolts and washers to the mounting tabs.

However, since the mounting tabs are formed of a flexible fabric material, there are drawbacks such as difficulty in maintaining assembly torque during assembly of the mounting tabs to the vehicle body using bolts and occurrence of sagging due to difficulty in maintaining the shape, which results in poor assemblability and workability during the assembly to the vehicle body.

In order to solve these problems, a method of attaching and securing hardware including a plastic plate and a push retainer to the mounting tab is used, but the mounting tab is pulled by the strong pressure generated when the airbag cushion is deployed, and due to this, an external force is applied to the plate, which can cause the hardware to break and scatter.

SUMMARY

In a general aspect, here is provided an apparatus for mounting a curtain airbag cushion capable of enhancing assemblability and workability by improving a mounting structure of the curtain airbag cushion, and fundamentally preventing occurrence of scattering due to hardware breakage, which is a conventional problem, by preventing hardware from breaking even under strong pressure generated when the airbag cushion is deployed.

Problems to be solved by the present invention are not limited to those mentioned above, and other problems not mentioned will be clearly understood by those skilled in the art from the following description.

In a general aspect, an apparatus for mounting a curtain airbag cushion, includes: a ramp on which the curtain airbag cushion folded in a rolled form is placed and supported, the ramp including a fixing portion; and a mounting plate coupled to the fixing portion of the ramp to fix the ramp to a vehicle body, wherein the mounting plate is provided with a fixing leg protruding toward the fixing portion, and wherein, in a state where the fixing leg is inserted in a structure that passes through a coupling hole formed in the fixing portion, the fixing leg is configured to be bent by an external force to fix the mounting plate to the fixing portion.

The mounting plate may include: a body having a plate-shaped structure; a pair of first fixing legs extending from an upper end of the body to the rear of the body; and a pair of second fixing legs extending from a lower end of the body to the rear of the body.

A distance between the pair of first fixing legs and a distance between the pair of second fixing legs may be different from each other.

The first fixing leg and the second fixing leg may be disposed side by side in a structure in which side surfaces of the first fixing leg and the second fixing leg partially come into contact with each other without overlapping each other in a bent state.

An end of the first fixing leg may be provided with a coupling protrusion that protrudes outward from a side surface that contacts the second fixing leg, wherein an end of the second fixing leg is provided with a coupling groove that is recessed inward from a side surface that contacts the first fixing leg, and wherein the coupling protrusion and the coupling groove are mutually interlocked to form an engagement.

The body may be provided with a bolt hole connected to a through-hole formed in the fixing portion in a state where the mounting plate is coupled to the fixing portion.

The body may be provided with a pin member configured to protrude toward a center of the bolt hole and engage with a thread of a fastening member that is connected through the bolt hole.

The fixing portion may be provided with a first storage groove for storing the bent first fixing leg and a second storage groove for storing the bent second fixing leg in a rear surface thereof.

An upper end of the first storage groove and a lower end of the second storage groove may be connected to the coupling hole that passes through the fixing portion, wherein a lower end of the first storage groove and an upper end of the second storage groove are connected in a width direction perpendicular to a length direction.

The ramp may include a support portion on which the curtain airbag cushion is placed, and a cover portion that extends forward from an upper end of the support portion and accommodates the curtain airbag cushion between the cover portion and the support portion, wherein a pair of fixing portions are provided in a structure that extends upward from an upper end of the support portion with the cover portion therebetween.

In another general aspect, an apparatus for mounting a curtain airbag cushion, includes: a ramp on which the curtain airbag cushion folded in a rolled form is placed and supported, the ramp including a fixing portion; and a mounting plate coupled to the fixing portion of the ramp to fix the ramp to a vehicle body, the mounting plate provided with a bolt hole connected to a through-hole formed in the fixing portion, wherein the mounting plate is provided with a fixing leg protruding toward the fixing portion, and wherein, in a state where the fixing leg is inserted in a structure that passes through a coupling hole formed in the fixing portion, the fixing leg is configured to be bent by an external force to fix the mounting plate to the fixing portion of the ramp.

The mounting plate may include: a body having a plate-shaped structure and provided with the bolt hole; a pair of first fixing legs extending from an upper end of the body to the rear of the body; and a pair of second fixing legs extending from a lower end of the body to the rear of the body.

The body may be provided with a plurality of tab members extending toward a center of the bolt hole, and the tab members are arranged to be spaced apart from each other along a periphery of the bolt hole.

The tab member may be provided around the bolt hole in a structure that protrudes rearward from the body toward the vehicle body.

An end of the tab member may be configured to engage with a thread of a fastening member that is connected through the bolt hole.

Figure 1:
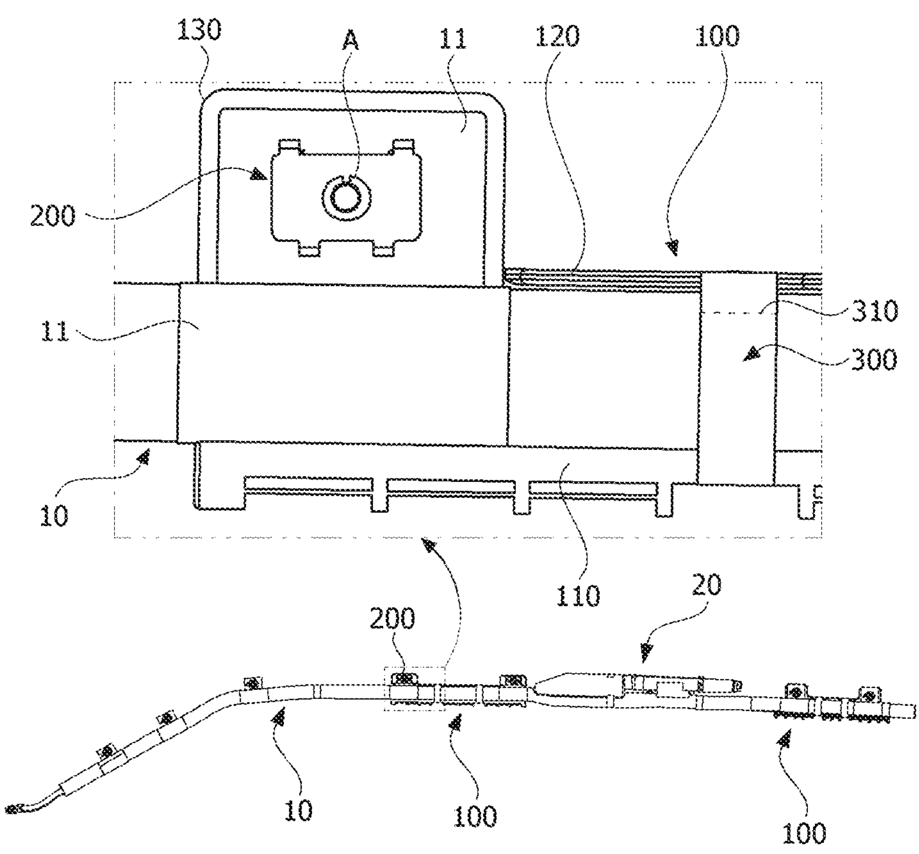
FIG. 1 is a view showing a curtain airbag according to an embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 shows a curtain airbag, and FIGS. 2 to 7 show an apparatus for mounting a curtain airbag cushion and configurations thereof.

A curtain airbag of a vehicle may include a curtain airbag cushion 10 that inflates and deploys when gas is injected, and an inflator 20 that generates gas when a vehicle collision occurs.

The curtain airbag cushion 10 and the inflator 20 may be assembled together and installed to be positioned on an upper body of a vehicle pillar. The inflator 20 is connected to a control device (not shown) of the vehicle, and when a collision is detected, the control device transmits a signal to the inflator 20. The inflator 20 receiving the signal generates gas. The curtain airbag cushion 10 inflates by the gas and unfolds toward a bottom of the vehicle, and is disposed between an occupant and a door to protect the occupant.

A mounting apparatus according to an embodiment of the present invention may be used to securely install the curtain airbag cushion 10 on a vehicle body.

Referring R to the drawings, the apparatus for mounting the curtain airbag cushion according to the embodiment of the present invention may include a ramp 100 and a mounting plate 200.

The ramp 100 may be configured to support the curtain airbag cushion 10 folded in a rolled form. In the embodiment, the curtain airbag cushion 10 may be shaped to extend in a front-rear direction of the vehicle and provided folded in a rolled form. The curtain airbag cushion 10 may be provided with a mounting tab 11 connected to the ramp 100.

The ramp 100 may be fixed to a vehicle body through a fastening member A. In the embodiment, the fastening member A may include a screw or a bolt.

The ramp 100 is provided with a fixing portion 130, and the fixing portion 130 may fix the ramp 100 to the vehicle body in conjunction with the fastening member A.

Figure 2:
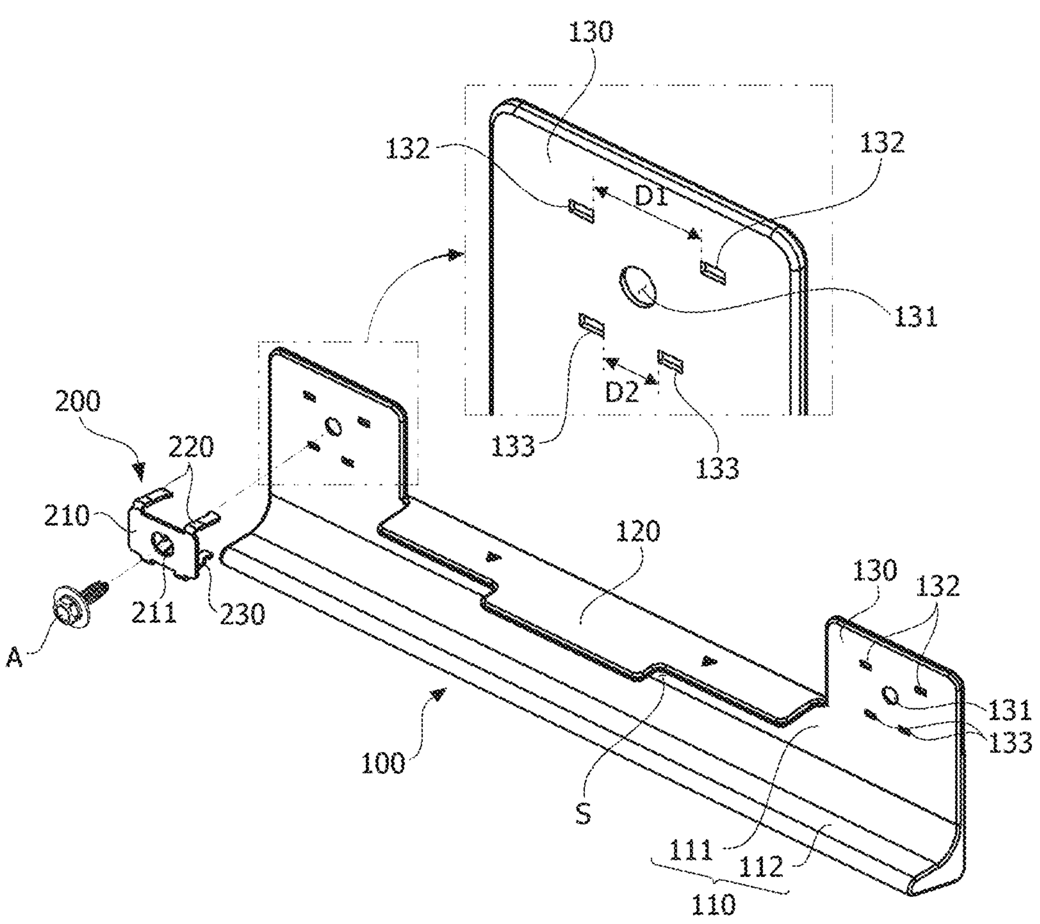
FIG. 2 is a view showing an apparatus for mounting a curtain airbag cushion according to an embodiment of the present invention.
Figure 3:
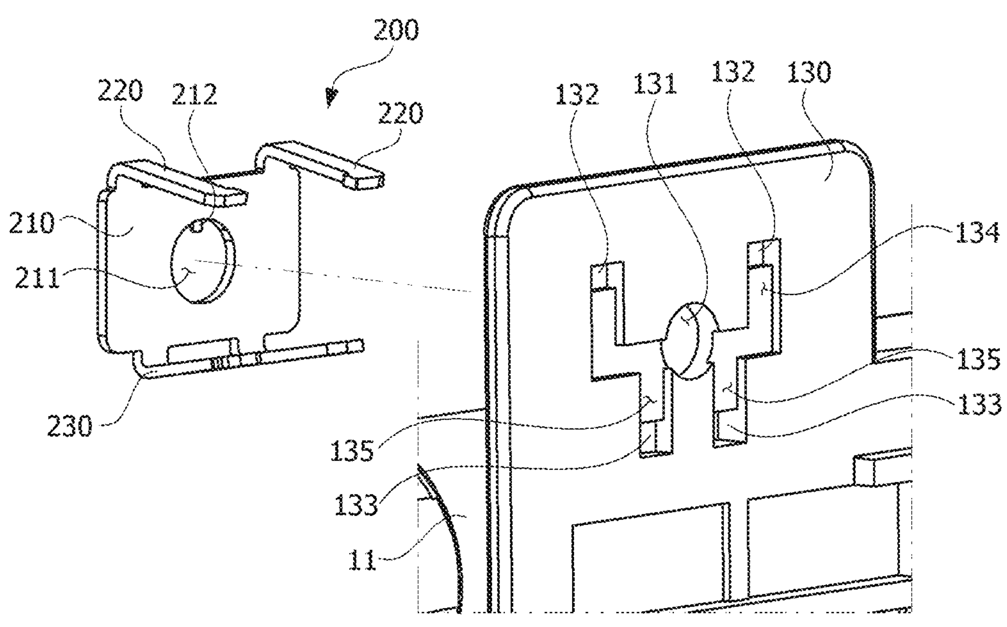
FIG. 3 is a view showing a rear surface of a fixing portion to which a mounting plate is coupled.
Figure 4A:
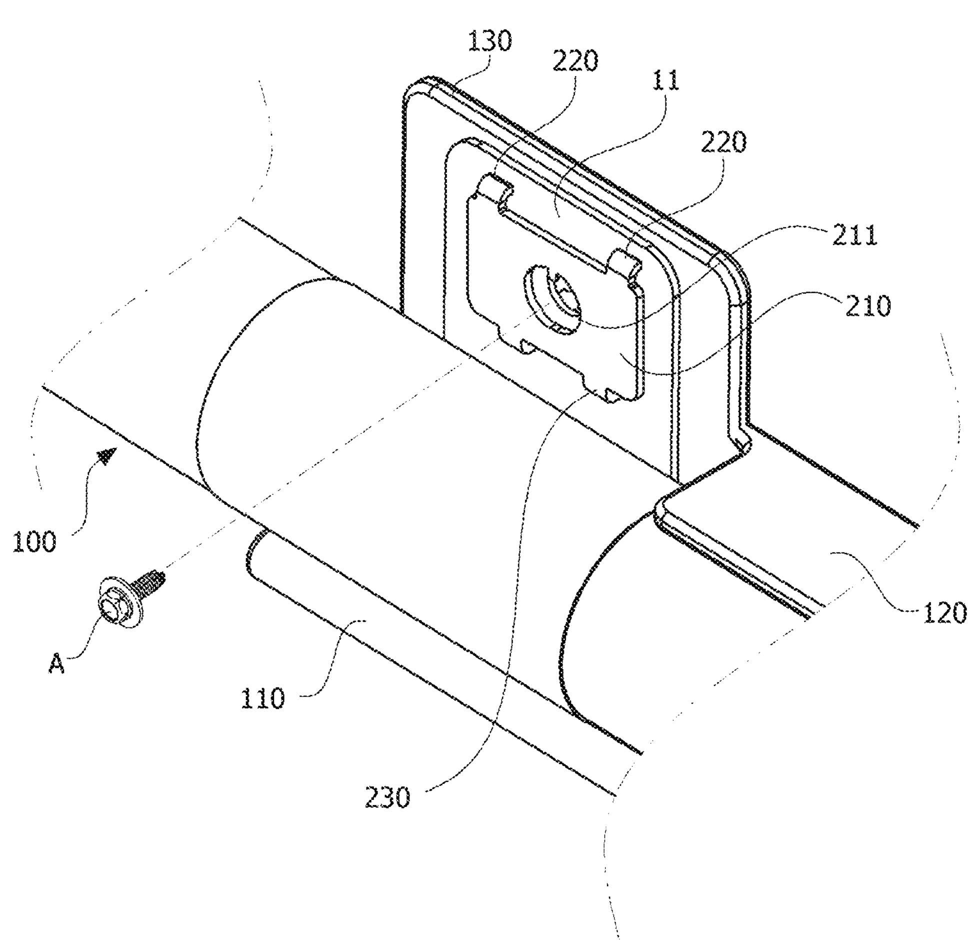
FIGS. 4A and 4B are views showing a state where the mounting plate is coupled to the fixing portion.
Figure 4B:
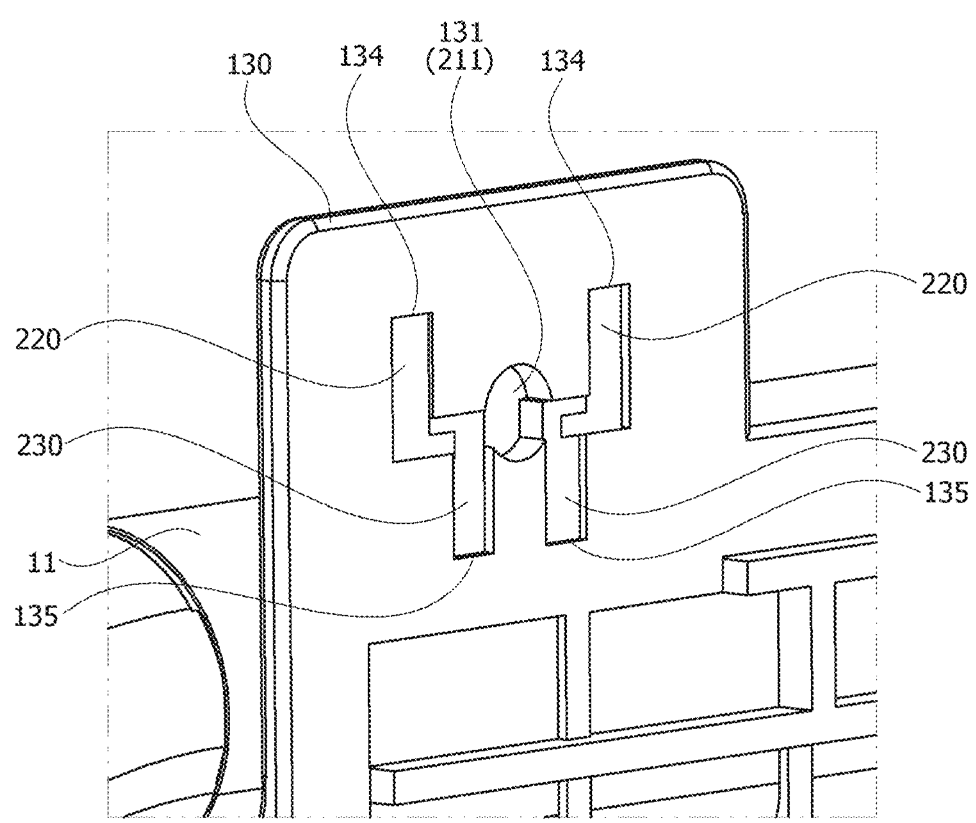
Figure 5:
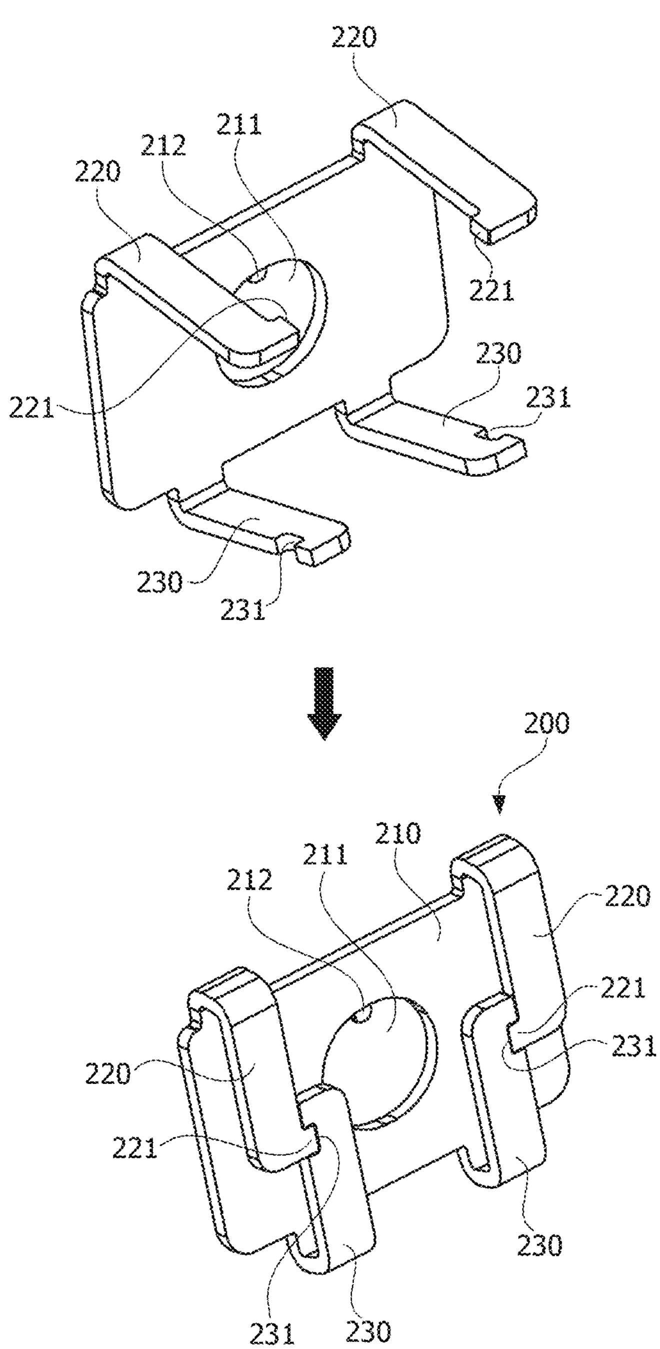
FIG. 5 is a view showing a state where a first fixing leg and a second fixing leg of the mounting plate are bent.
Figure 6:
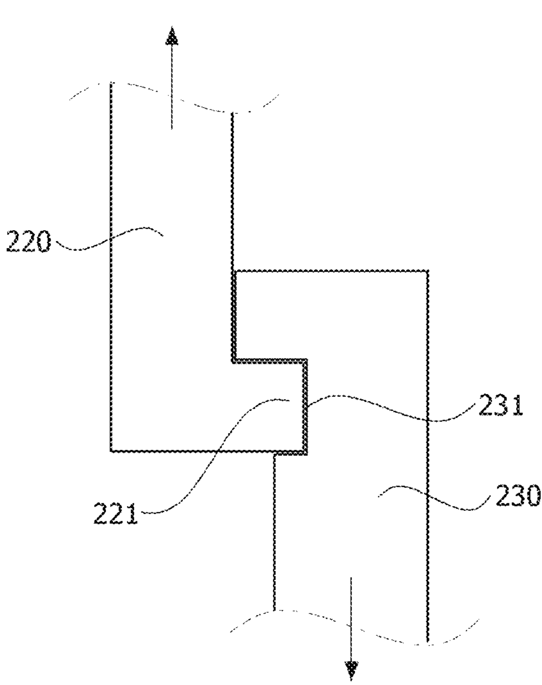
FIG. 6 is a view showing a state where the first fixing leg and the second fixing leg are engaged.

Referring to FIG. 2, the ramp 100 may include a support portion 110 on which the curtain airbag cushion 10 is placed, a cover portion 120 extending forward from an upper end of the support portion 110, and the fixing portion 130 extending upward from the upper end of the support portion 110.

The ramp 100 may have a structure in which the support portion 110, the cover portion 120, and the fixing portion 130 are integrally formed. In the embodiment, the ramp 100 may be made of a plastic having rigidity. However, the material of the ramp 100 is not limited thereto.

The support portion 110 may include a first part 111 that is connected in succession to the fixing portion 130 and vertically extends, and a second part 112 that extends forward from a lower end of the first part 111. The support portion 110 may have an overall "L" shaped cross-sectional structure.

The cover portion 120 may be disposed to cover the upper portion of the curtain airbag cushion 10 in a state where the curtain airbag cushion 10 is placed on the support portion 110. The cover portion 120 is configured to extend forward from the upper end of the support portion 110 to accommodate the curtain airbag cushion 10 between the cover portion 120 and the support portion 110. Specifically, the cover portion 120 may extend forward between a pair of fixing portions 130 and form an internal space S having a roughly "C" shape in conjunction with the first part 111 and the second part 112 of the support portion 110. The roll-folded curtain airbag cushion 10 may be accommodated within the interior space S.

A pair of fixing portions 130 may be provided in a structure that extends upward from an upper end of the support portion 110 with the cover portion 120 interposed therebetween. The fixing portion 130 has an overall flat quadrangular plate structure, and may be provided at each of both longitudinal edges of the first part 111 to extend upward.

A through-hole 131 to which a fastening member A is connected by passing therethrough may be formed in the fixing portion 130. The through-hole 131 may be formed through the fixing portion 130 approximately at the center of the fixing portion 130.

Coupling holes 132 and 133 may be formed in the fixing portion 130. Fixing legs 220 and 230 of a mounting plate 200 to be described below may be coupled to the coupling holes 132 and 133.

The coupling holes 132 and 133 may be formed by passing through the fixing portion 130 at upper and lower portions of the through-hole 131, respectively. In the embodiment, a pair of coupling holes 132 may be formed at the upper portion of the through-hole 131 and a pair of coupling holes 133 may be formed at the lower portion, so that a total of four coupling holes may be provided. In this case, a distance D1 between the pair of coupling holes 132 provided at the upper portion of the through-hole 131 and a distance D2 between the pair of coupling holes 133 provided at the lower portion of the through-hole 131 may differ.

Storage grooves 134 and 135 for storing the fixing legs 220 and 230 may be formed in the fixing portion 130. The storage grooves 134 and 135 may be formed in a rear surface of the fixing portion 130, and may be configured to store the bent fixing legs 220 and 230 in the rear surface of the fixing portion 130. The fixing legs 220 and 230 will be described below.

Meanwhile, the curtain airbag cushion 10 may be configured so that the mounting tab 11 is disposed on the front surface of the fixing portion 130 in a state of being accommodated in the internal space S of the ramp 100, and the fastening member A passes through the mounting tab 11 when fastened through the through-hole 131. In addition, the fixing legs 220 and 230 of the mounting plate 200 may be configured to pass through the mounting tab 11 when coupled to the coupling holes 132 and 133. Accordingly, the mounting tab 11 disposed between the fixing portion 130 and the mounting plate 200 may be tightly attached and fixed to the fixing portion 130 through the fastening member A and the mounting plate 200.

In addition, in the state where the curtain airbag cushion 10 is accommodated in the internal space S of the ramp 100, its movement may be restricted by a fixing strap 300 that integrally wraps the ramp 100 and the curtain airbag cushion 10.

The fixing strap 300 may prevent the curtain airbag cushion 10 placed on the ramp 100 from moving and being separated from the ramp 100 during the process of fixing the ramp 100 to the vehicle body.

In the embodiment, the fixing strap 300 may include an adhesive tape, and the adhesive force may be used to simultaneously bind the curtain airbag cushion 10 and the ramp 100.

The fixing strap 300 may be configured to break when the curtain airbag cushion 10 is deployed. To this end, the fixing strap 300 may be made of a material that is easy to break or may be provided with a tear line 310 for breaking.

In the embodiment, at least two fixing strap 300 may be provided. However, the number of fixing straps 300 is not limited thereto, and two or more may be provided as needed.

The mounting plate 200 may be coupled to the fixing portion 130 of the ramp 100 to protect the fixing portion 130.

Referring to the drawings, the mounting plate 200 may be provided with a bolt hole 211 that is connected to the through-hole 131 formed in the fixing portion 130 in a state of being coupled to the fixing portion 130. The ramp 100 may be fixed to the vehicle body using the fastening member A that integrally passes through both the bolt hole 211 and the through-hole 131 and is fastened to the vehicle body.

The mounting plate 200 may be provided with the fixing legs 220 and 230 that protrude toward the fixing portion 130, and may be fixed to the fixing portion 130 by being bent by an external force in a state where the fixing legs 220 and 230 are inserted in a structure that passes through the coupling holes 132 and 133 formed in the fixing portion 130.

Specifically, the mounting plate 200 may include a body 210 having a plate-shaped structure, a pair of first fixing legs 220 extending from an upper end of the body 210 to the rear of the body 210, and a pair of second fixing legs 230 extending from a lower end of the body 210 to the rear of the body 210. In the embodiment, the mounting plate 200 may be made of a metal material having high rigidity.

The body 210 has a roughly quadrilateral shape, and the bolt hole 211 may be formed in the center.

The body 210 may be provided with a pin member 212 that protrudes toward the center of the bolt hole 211. The pin member 212 may be configured to engage with a thread of the fastening member A coupled to the bolt hole 211. Accordingly, the pin member 212 may perform the same function as a push retainer that fixes the fastening member A to prevent the fastening member A from being separated from the bolt hole 211. In addition, the fastening member A may also perform the same function as a nut that is threadedly engaged with the fastening member A to fix the fastening member A.

A pair of first fixing legs 220 may be disposed at a predetermined interval from the upper end of the body 210, and a pair of second fixing legs 230 may be disposed at a predetermined interval from the lower end of the body 210.

A distance between the pair of first fixing legs 220 and a distance between the pair of second fixing legs 230 may be different from each other. In the present embodiment, the distance between the pair of first fixing legs 220 is shown as being be greater than the distance between the pair of second fixing legs 230. Specifically, a distance between inner surfaces of the pair of first fixing legs 220 may be configured to correspond to a distance between outer surfaces of the pair of second fixing legs 230. That is, the pair of second fixing legs 230 may be disposed between the pair of first fixing legs 220.

The coupling holes 132 and 133 provided in the fixing portion 130 may be positioned corresponding to the distance between the first fixing legs 220 and the distance between the second fixing legs 230. Specifically, the distance D1 between the pair of coupling holes 132 provided at the upper portion of the through-hole 131 may correspond to the distance between the first fixing legs 220, and the distance D2 between the pair of coupling holes 133 provided at the lower portion of the through-hole 131 may correspond to the distance between the second fixing legs 230.

These first fixing legs 220 and second fixing legs 230 may be inserted in a structure that passes through the coupling holes 132 and 133 from the front surface of the fixing portion 130, and may be bent toward the fixing portion 130 by an external force on the rear surface of the fixing portion 130 to fix the body 210 to the fixing portion 130. In this case, the bent first fixing legs 220 and second fixing legs 230 may be disposed in the storage grooves 134 and 135 in the rear surface of the fixing portion 130.

The first fixing legs 220 and the second fixing legs 230 are disposed side by side in a structure in which side surfaces of the first fixing legs 220 and the second fixing leg 230 partially come into contact with each other without overlapping each other in a bent state. That is, since the distance between the first fixing legs 220 is greater than the distance between the second fixing legs 230, portions where ends of the first fixing legs 220 partially meet ends of the second fixing legs 230 may have a structure in which, without being stacked or overlapped with each other, the inner surfaces of the first fixing legs 220 and the outer surfaces of the second fixing legs 230 come into surface contact with each other in a section where the ends meet.

The end of the first fixing leg 220 may be provided with a coupling protrusion 221 that protrudes outwardly from the surface that comes into contact with the second fixing leg 230. Correspondingly, the end of the second fixing leg 230 may be provided with a coupling groove 231 that is formed recessed inward from the side surface that comes into contact with the first fixing leg 220. In addition, the first fixing leg 220 and the second fixing leg 230 are configured so that the coupling protrusion 221 and the coupling groove 231 are mutually interlocked to form an engagement. In this way, the first fixing leg 220 and the second fixing leg 230 are mutually engaged through the coupling protrusion 221 and the coupling groove 231, thereby preventing the mounting plate 200 from being easily separated from the fixing portion 130 due to an external force.

Figure 7A:
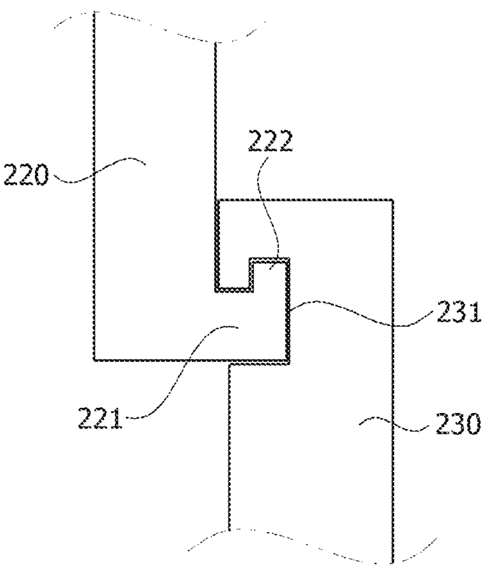
FIGS. 7A and 7B are views showing modified examples of a coupling protrusion provided on the first fixing leg and a coupling groove provided on the second fixing leg.
Figure 7B:
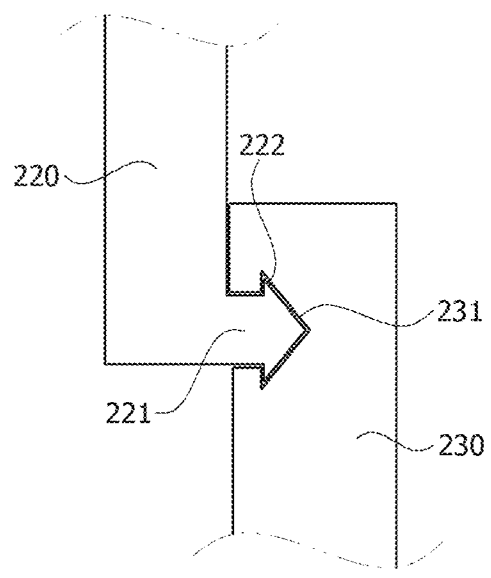

FIGS. 7A and 7B show modified examples of the coupling protrusion and the coupling groove.

As shown in FIG. 7A, the coupling protrusion 221 may further include a sub-protrusion 222, and the coupling groove 231 may have a structure that engages with the coupling protrusion 221 including the sub-protrusion 222.

As shown in FIG. 7B, the sub-protrusion 222 may be transformed into various shapes, and may be configured to have an arrow-shaped structure in conjunction with the coupling protrusion 221. Through this complicated structure, the engaging strength between the coupling protrusion 221 and the coupling groove 231 may be further improved.

Meanwhile, the storage grooves 134 and 135 provided in the rear surface of the fixing portion 130 may include a first storage groove 134 for storing the bent first fixing leg 220 and a second storage groove 135 for storing the bent second fixing leg 230.

An upper portion of the first storage groove 134 and a lower portion of the second storage groove 135 may be connected to the coupling holes 132 and 133 passing through the fixing portion 130. That is, the first storage groove 134 may have a structure that longitudinally extends downwardly from the coupling hole 132 above the through-hole 131, and the second storage groove 135 may have a structure that longitudinally extends upwardly from the coupling hole 133 below the through-hole 131. In addition, the lower end of the first storage groove 134 and the upper end of the second storage groove 135 may be connected in a width direction perpendicular to a length direction.

In the embodiment, a depth of the first storage groove 134 and the second storage groove 135 may have a size corresponding to the thickness of the first fixing leg 220 and the second fixing leg 230.

In this way, by configuring the first fixing legs 220 and the second fixing legs 230 to be respectively stored in the first storage grooves 134 and the second storage grooves 135 in the rear surface of the fixing portion 130 in the bent state, the first fixing legs 220 and the second fixing legs 230 are restrained from being deformed by external forces, thereby allowing the fixing force through the first fixing legs 220 and the second fixing legs 230 to be further improved.

This mounting plate 200 may fix the fastening member A, and at the same time, may prevent the fixing portion 130 from being damaged and the fastening member A from scattering due to the strong pressure generated when the curtain airbag cushion 10 inflates and deploys.

Specifically, when the mounting tab 11 is strongly pulled downward and forward by the strong pressure generated as the curtain airbag cushion 10 deploys, the force is transmitted to the mounting plate 200 that tightly presses the mounting tab 11 against the fixing portion 130 from the front of the mounting tab 11, and stress is primarily concentrated on the second fixing leg 230 of the mounting plate 200. Thereby, the second fixing leg 230 deforms by moving downward, but the first fixing leg 220 holds the second fixing leg 230 to maintain the engagement, thereby preventing deformation. In particular, in a state of being stored in the storage grooves 134 and 135, the first fixing leg 220 and the second fixing leg 230 are further restricted from deforming.

Therefore, stress is distributed by the first fixing leg 220 and the second fixing leg 230 that are mutually engaged to prevent deformation, thereby preventing the mounting plate 200 from being separated from the fixing portion 130 and the fixing portion 130 from being damaged. That is, there is an effect in that the problem of breakage and scattering of the conventional hardware does not occur.

In particular, in the present embodiment, by omitting the push retainer included in the conventional hardware, there is an advantage in that the problem of scattering of the push retainer separated from the fastening member A does not occur.

FIGS. 8 to 12 show an apparatus for mounting a curtain airbag cushion according to another embodiment and components thereof.

Referring to the drawings, the apparatus for mounting the curtain airbag cushion according to the embodiment of the present invention may include a ramp 100 and a mounting plate 400.

The ramp 100 may be configured to support the curtain airbag cushion 10 folded in a rolled form. The ramp 100 is provided with a fixing portion 130, and the fixing portion 130 may fix the ramp 100 to the vehicle body in conjunction with a fastening member A.

Figure 8:
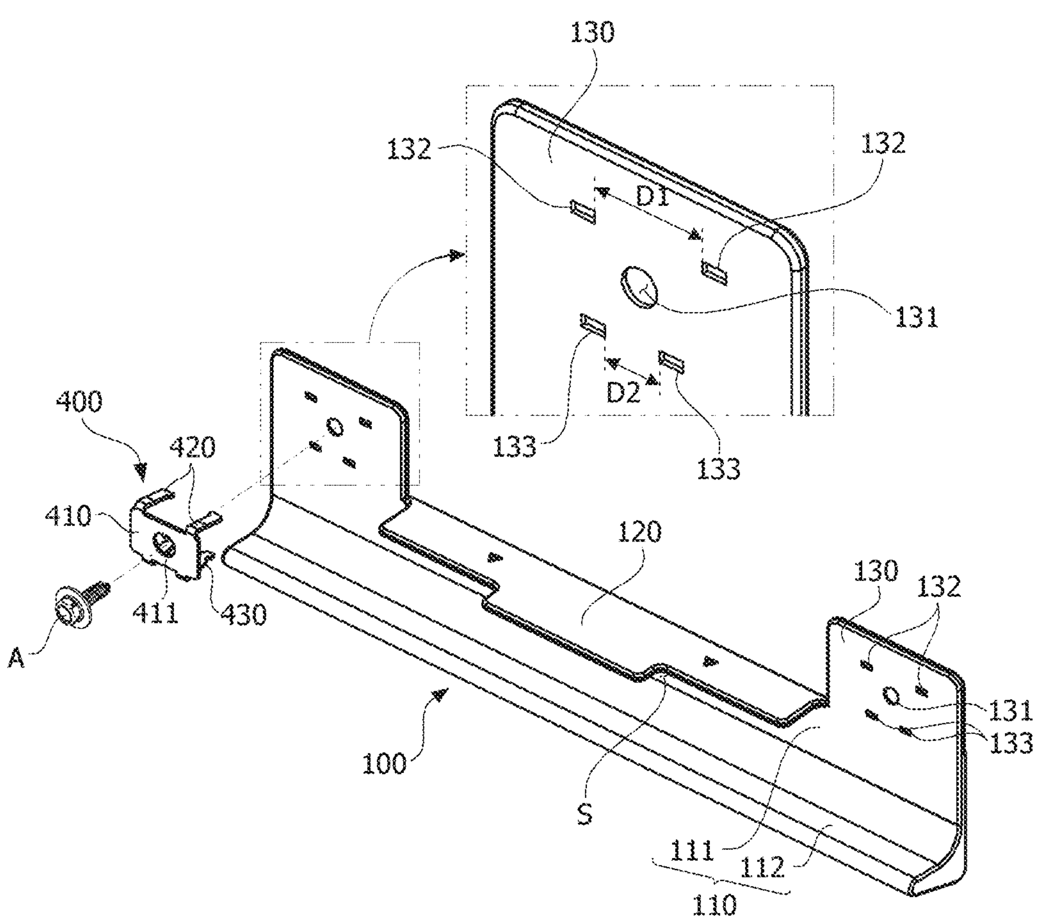
FIG. 8 is a view showing an apparatus for mounting a curtain airbag cushion according to another embodiment of the present invention.
Figure 9:
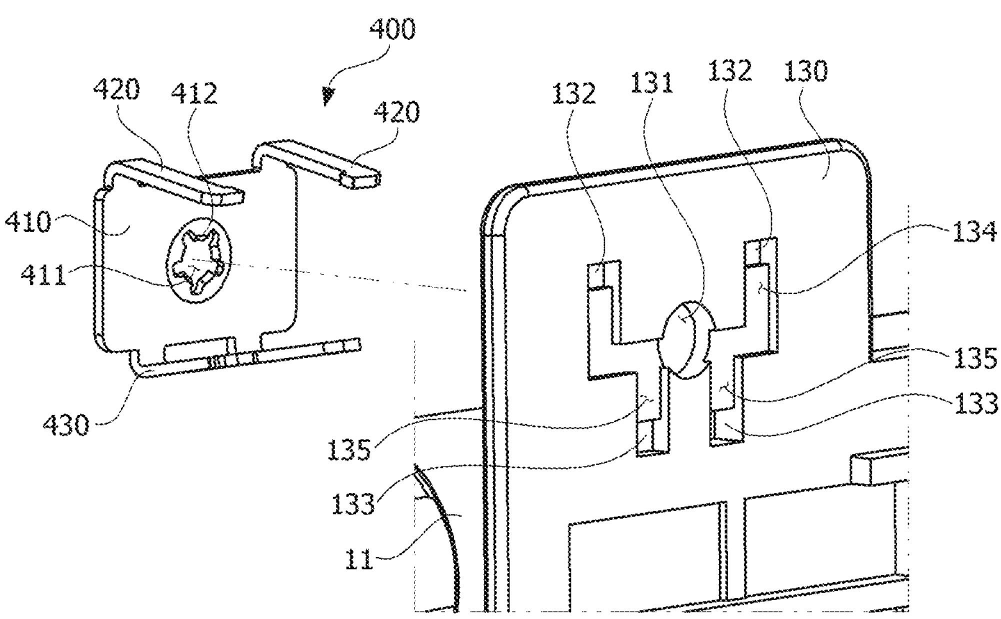
FIG. 9 is a view showing a mounting plate in the apparatus for mounting a curtain airbag cushion of FIG. 8.
Figure 10A:
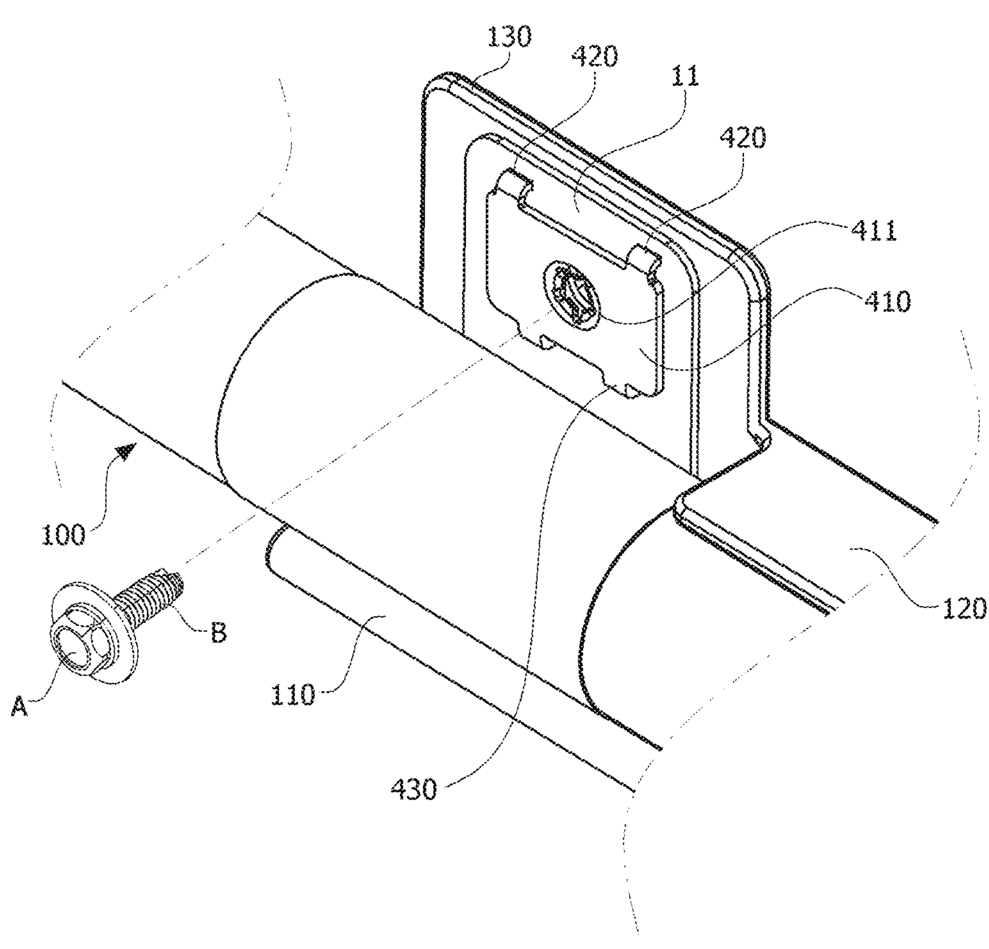
FIGS. 10A and 10B are views showing a state where the mounting plate is coupled to a fixing portion.
Figure 10B:
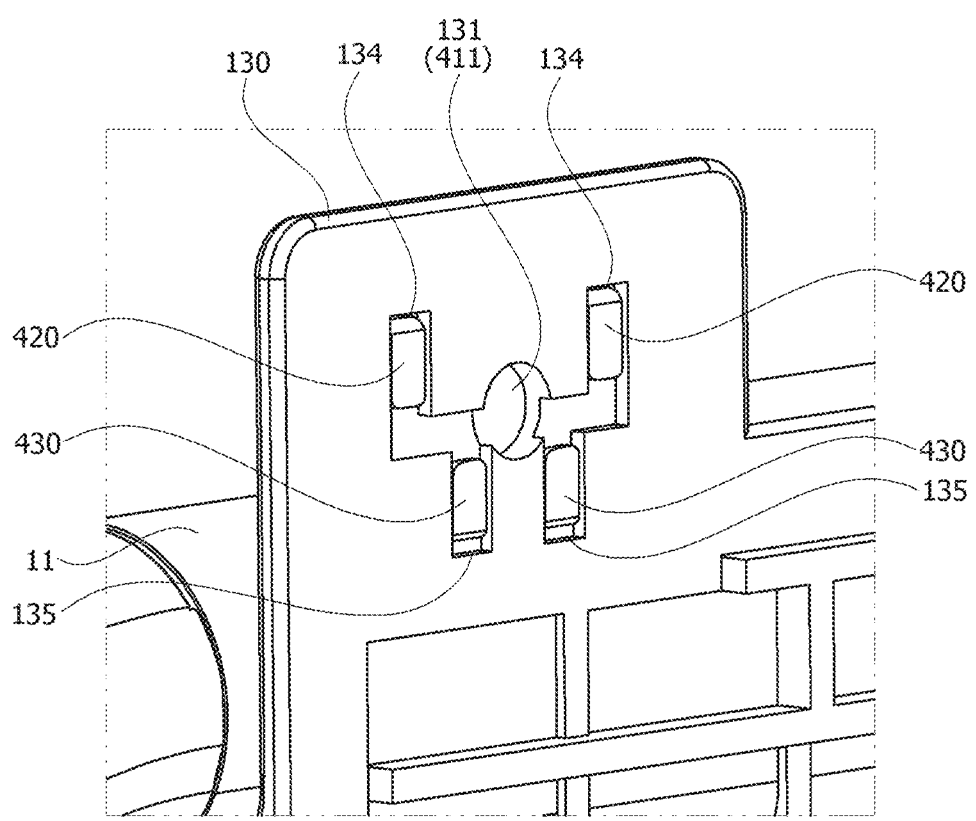
Figure 11:
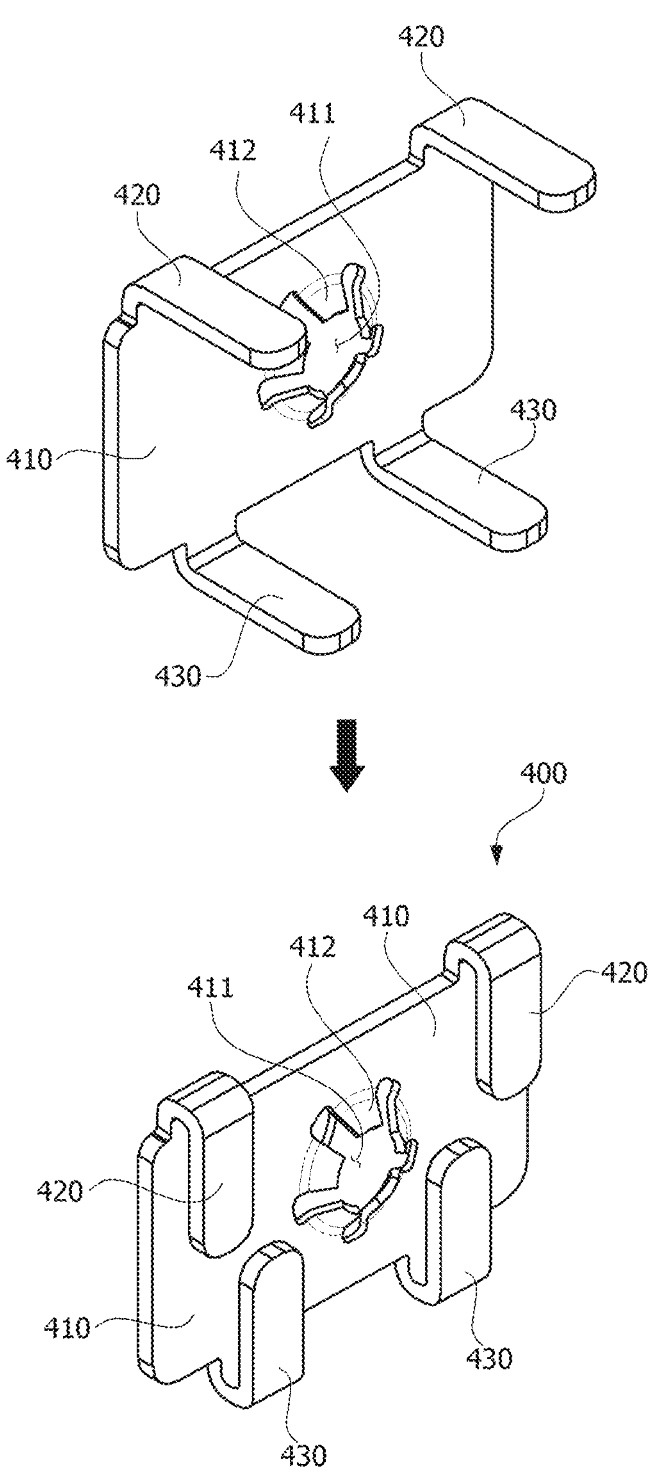
FIG. 11 is a view showing a state where a first fixing leg and a second fixing leg of the mounting plate are bent.

Referring to FIG. 8, the ramp 100 may include a support portion 110 on which the curtain airbag cushion 10 is placed, a cover portion 120 extending forward from an upper end of the support portion 110, and the fixing portion 130 extending upward from the upper end of the support portion 110.

The configuration and structure of this ramp 100 are substantially the same as the configuration and structure of the ramp 100 according to the embodiment in FIG. 2, and thus a description thereof is omitted.

The mounting plate 400 may be coupled to the fixing portion 130 of the ramp 100 to protect the fixing portion 130.

Referring to the drawings, the mounting plate 400 may be provided with a bolt hole 211 that is connected to a through-hole 131 formed in the fixing portion 130 in a state of being coupled to the fixing portion 130. The ramp 100 may be fixed to the vehicle body using the fastening member A that integrally passes through the bolt hole 411 and the through-hole 131 and is fastened to the vehicle body.

The mounting plate 400 may be provided with the fixing legs 420 and 430 that protrude toward the fixing portion 130, and may be fixed to the fixing portion 130 by being bent by an external force in a state where the fixing legs 420 and 430 are inserted in a structure that passes through coupling holes 132 and 133 formed in the fixing portion 130.

Specifically, the mounting plate 400 may include a body 410 having a plate-shaped structure, a pair of first fixing legs 420 extending from an upper end of the body 410 to the rear of the body 410, and a pair of second fixing legs 430 extending from a lower end of the body 410 to the rear of the body 410. In the embodiment, the mounting plate 400 may be made of a metal material having high rigidity.

The body 410 has a roughly quadrilateral shape, and the bolt hole 411 may be formed in the center.

The body 410 may be provided with a tab member 412 that extends toward the center of the bolt hole 411.

A plurality of tab members 412 may be arranged to be spaced apart from each other along the periphery of the bolt hole 411. The tab member 412 may be provided around the bolt hole 411 in a structure that protrudes rearward from the body 410 toward the vehicle body.

An end of the tab member 412 may be configured to engage with a thread B formed on the fastening member A during a process of fastening the fastening member A to the vehicle body through the bolt hole 411. That is, the tab member 412 may perform the same function as the push retainer for securing the fastening member A. In addition, the fastening member A may also perform the same function as a nut that is threadedly engaged with the fastening member A to fix the fastening member A.

The pair of first fixing legs 420 may be disposed at a predetermined interval from the upper end of the body 410, and the pair of second fixing legs 430 may be disposed at a predetermined interval from the lower end of the body 410.

A distance between the pair of first fixing legs 420 and a distance between the pair of second fixing legs 430 may be different from each other. In the present embodiment, the distance between the pair of first fixing legs 420 is shown as being be greater than the distance between the pair of second fixing legs 430. Specifically, a distance between inner surfaces of the pair of first fixing legs 420 may be configured to correspond to a distance between outer surfaces of the pair of second fixing legs 430. That is, the pair of second fixing legs 430 may be disposed between the pair of first fixing legs 420.

The coupling holes 132 and 133 provided in the fixing portion 130 may be positioned corresponding to the distance between the first fixing legs 420 and the distance between the second fixing legs 430. Specifically, the distance D1 between the pair of coupling holes 132 provided at the upper portion of the through-hole 131 may correspond to the distance between the first fixing legs 420, and the distance D2 between the pair of coupling holes 133 provided at the lower portion of the through-hole 131 may correspond to the distance between the second fixing legs 430.

These first fixing legs 420 and second fixing legs 430 may be inserted in a structure that passes through the coupling holes 132 and 133 from the front surface of the fixing portion 130, and may be bent toward the fixing portion 130 by an external force on the rear surface of the fixing portion 130 to fix the body 410 to the fixing portion 130. In this case, the bent first fixing legs 420 and second fixing legs 430 may be disposed in storage grooves 134 and 135 in the rear surface of the fixing portion 130.

Meanwhile, the storage grooves 134 and 135 provided in the rear surface of the fixing portion 130 may include a first storage groove 134 for storing the bent first fixing leg 420 and a second storage groove 135 for storing the bent second fixing leg 430.

An upper portion of the first storage groove 134 and a lower portion of the second storage groove 135 may be connected to the coupling holes 132 and 133 passing through the fixing portion 130. That is, the first storage groove 134 may have a structure that longitudinally extends downwardly from the coupling hole 132 above the through-hole 131, and the second storage groove 135 may have a structure that longitudinally extends upwardly from the coupling hole 133 below the through-hole 131. In addition, the lower end of the first storage groove 134 and the upper end of the second storage groove 135) may be connected in a width direction perpendicular to a length direction.

In the embodiment, a depth of the first storage groove 134 and the second storage groove 135 may have a size corresponding to the thickness of the first fixing leg 420 and the second fixing leg 430.

In this way, by configuring the first fixing legs 420 and the second fixing legs 430 to be respectively stored in the first storage grooves 134 and the second storage grooves 135 in the rear surface of the fixing portion 130 in the bent state, the first fixing legs 420 and the second fixing legs 430 are restrained from being deformed by external forces, thereby allowing the fixing force through the first fixing legs 420 and the second fixing legs 430 to be further improved.

This mounting plate 400 may fix the fastening member A, and at the same time, may prevent the fixing portion 130 from being damaged and the fastening member A from being separated and scattering due to the strong pressure generated when the curtain airbag cushion 10 inflates and deploys.

Specifically, when the mounting tab 11 pushes the fixing portion 130 backwards by the strong pressure generated as the curtain airbag cushion 10 deploys, the force is transmitted to the mounting plate 400 that tightly presses the mounting tab 11 against the fixing portion 130 from the front of the mounting tab 11. The mounting plate 400 distributes the force through the pair of first fixing legs 420 and the pair of second fixing legs 430 and maintains a state of being fastened to the fixing portion 130. In this case, in a state of being stored in the storage grooves 134 and 135, the first fixing leg 420 and the second fixing leg 430 may be prevented from deforming. Accordingly, it is possible to prevent the mounting plate 400 from being separated from the fixing portion 130, and the fixing portion 130 from being damaged. That is, there is an effect in that the problem of breakage and scattering of the conventional hardware does not occur.

In addition, the apparatus is configured so that the tab member 412 that performs the function of the push retainer is disposed in front of the mounting tab 11, thereby restricting the fastening member A that engages the tab member 412 from moving forward from the bolt hole 411. Accordingly, the problem of the fastening member A being separated from the bolt hole 411 and scattering due to the pushing force of the mounting tab 11 does not occur. That is, in the present embodiment, the push retainer included in the conventional hardware is omitted, and accordingly, there is an advantage in that the problem of the conventional push retainer disposed at the rear of the mounting tab 11 being separated from the fastening member A and scattering due to the pushing force of the mounting tab 11 does not occur.

Figure 12:
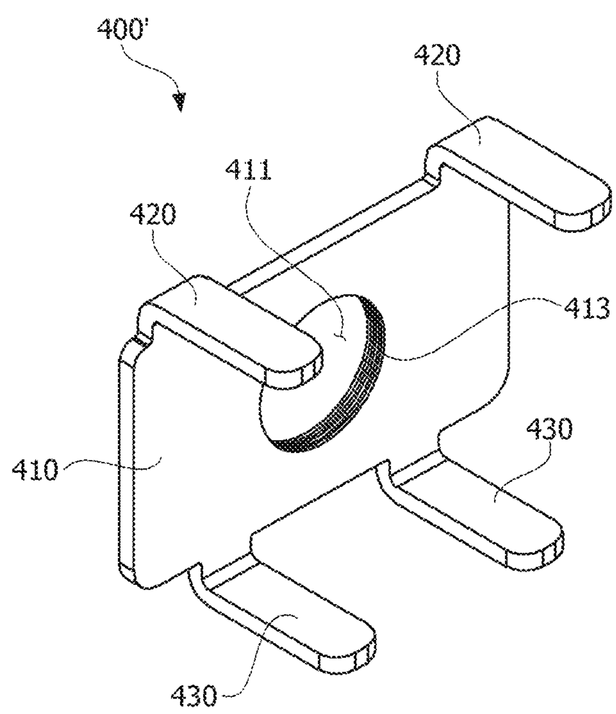
FIG. 12 is a view showing a modified example of the mounting plate.

FIG. 12 shows a modified example of the mounting plate.

A mounting plate 400' may include a body 410 having a plate-shaped structure, a pair of first fixing legs 420 extending from an upper end of the body 410 to the rear of the body 410, and a pair of second fixing legs 430 extending from a lower end of the body 410 to the rear of the body 410.

The body 410 has a roughly quadrilateral shape, and the bolt hole 411 may be formed in the center.

A thread 413 that engages with a thread B of the fastening member A may be formed on an inner surface of the bolt hole 411. Accordingly, when the fastening member A is inserted into the bolt hole 411 and fastened, the bolt hole 411 and the fastening member A may be mutually engaged through threaded engagement. That is, the body 410 may function as a nut threadedly engaged with the fastening member A to fix the fastening member A while tightly pressing and securing the mounting tab 11 against the fixing portion 130 from the front of the mounting tab 11. Accordingly, the problem of the fastening member A being separated from the bolt hole 411 and scattering due to the pushing force of the mounting tab 11 does not occur.

According to an embodiment of the present invention, it is possible to provide an apparatus for mounting a curtain airbag cushion capable of enhancing assemblability and workability by improving a mounting structure of the curtain airbag cushion, and fundamentally preventing occurrence of scattering due to hardware breakage, which is a conventional problem, by preventing hardware from breaking even under strong pressure generated during deployment of the airbag cushion.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for mounting a curtain airbag cushion, the apparatus comprising:

a ramp on which the curtain airbag cushion folded in a rolled form is placed and supported, the ramp including a fixing portion having coupling holes formed therein; and a mounting plate coupled to the fixing portion of the ramp to fix the ramp to a vehicle body, wherein the mounting plate is provided with fixing legs configured to protrude toward the fixing portion, wherein, in a state where the fixing legs are inserted in a structure that passes through the coupling holes formed in the fixing portion, the fixing legs are configured to be bent by an external force to fix the mounting plate to the fixing portion, and wherein the bent fixing legs are configured to be stored in storage grooves formed in a rear surface of the fixing portion.

2. The apparatus of claim 1, wherein the mounting plate includes a body having a plate-shaped structure, and wherein the fixing legs include: a pair of first fixing legs extending from an upper end of the body to a rear of the body; and a pair of second fixing legs extending from a lower end of the body to the rear of the body.

3. The apparatus of claim 2, wherein a distance between the pair of first fixing legs and a distance between the pair of second fixing legs are different from each other.

4. The apparatus of claim 2, wherein the first fixing legs and the second fixing legs are disposed side by side in the structure in which side surfaces of the first fixing legs and the second fixing legs partially come into contact with each other without overlapping each other in a bent state.

5. The apparatus of claim 4, wherein each end of the first fixing legs are provided with a coupling protrusion that protrudes outward from the side surface that contacts the second fixing legs, wherein each end of the second fixing legs is provided with a coupling groove that is recessed inward from the side surface that contacts the first fixing legs, and wherein the coupling protrusions and the coupling grooves are mutually interlocked to form engagements.

6. The apparatus of claim 2, wherein the body is provided with a bolt hole connected to a through-hole formed in the fixing portion in a state where the mounting plate is coupled to the fixing portion.

7. The apparatus of claim 6, wherein the body is provided with a pin member configured to protrude toward a center of the bolt hole and engage with a thread of a fastening member that is connected through the bolt hole.

8. The apparatus of claim 2, wherein the storage grooves include first storage grooves for storing the bent first fixing legs and second storage grooves for storing the bent second fixing legs.

9. The apparatus of claim 8, wherein upper ends of the first storage grooves and lower ends of the second storage grooves are connected to the coupling holes that pass through the fixing portion, and wherein lower ends of the first storage grooves and upper ends of the second storage grooves are connected in a width direction perpendicular to a length direction.

10. The apparatus of claim 1, wherein the ramp includes a support portion on which the curtain airbag cushion is placed, and a cover portion that extends forward from an upper end of the support portion and accommodates the curtain airbag cushion between the cover portion and the support portion, and wherein a pair of the fixing portions are provided in a structure that extends upward from an upper end of the support portion with the cover portion therebetween.

11. An apparatus for mounting a curtain airbag cushion, comprising:

a ramp on which the curtain airbag cushion folded in a rolled form is placed and supported, the ramp including a fixing portion having through-holes formed therein; and a mounting plate coupled to the fixing portion of the ramp to fix the ramp to a vehicle body, the mounting plate provided with a bolt hole connected to the through-hole formed in the fixing portion, wherein the mounting plate is provided with fixing legs configured to protrude toward the fixing portion, wherein, in a state where the fixing legs are inserted in a structure that passes through the through-holes formed in the fixing portion, the fixing legs are configured to be bent by an external force to fix the mounting plate to the fixing portion of the ramp, and wherein the bent fixing legs are configured to be stored in storage grooves formed in a rear surface of the fixing portion.

12. The apparatus of claim 11, wherein the mounting plate includes a body having a plate-shaped structure and provided with the bolt hole and wherein the fixing legs include: a pair of first fixing legs extending from an upper end of the body to a rear of the body; and a pair of second fixing legs extending from a lower end of the body to the rear of the body.

13. The apparatus of claim 12, wherein the body is provided with a plurality of tab members extending toward a center of the bolt hole, and the tab members are arranged to be spaced apart from each other along a periphery of the bolt hole.

14. The apparatus of claim 13, wherein the tab members are provided around the bolt hole in a structure that protrudes rearward from the body toward the vehicle body.

15. The apparatus of claim 14, wherein ends of the tab members are configured to engage with a thread of a fastening member that is connected through the bolt hole.

* * * * *